United States Patent
Liao et al.

(10) Patent No.: US 10,783,616 B2
(45) Date of Patent: Sep. 22, 2020

(54) METHOD AND APPARATUS FOR SHARING AND DOWNLOADING LIGHT FIELD IMAGE

(71) Applicant: HUAWEI TECHNOLOGIES CO., LTD., Shenzhen, Guangdong (CN)

(72) Inventors: Heng Liao, Shenzhen (CN); Xueyan Huang, Shenzhe (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 156 days.

(21) Appl. No.: 15/938,571

(22) Filed: Mar. 28, 2018

(65) Prior Publication Data
US 2018/0218478 A1 Aug. 2, 2018

Related U.S. Application Data

(63) Continuation of application No. PCT/CN2015/090967, filed on Sep. 28, 2015.

(51) Int. Cl.
*G06T 5/00* (2006.01)
*G06K 9/00* (2006.01)
(Continued)

(52) U.S. Cl.
CPC .......... *G06T 5/003* (2013.01); *G06K 9/00228* (2013.01); *G06K 9/00288* (2013.01);
(Continued)

(58) Field of Classification Search
CPC .......... H04N 5/23212; H04N 5/23219; H04N 5/22541; G06K 9/00221; G06K 9/32;
(Continued)

(56) References Cited

U.S. PATENT DOCUMENTS 9,143,678 B2  9/2015  Park et al.
2005/0278749 A1  12/2005  Ewert et al.
(Continued)

FOREIGN PATENT DOCUMENTS

CN  1794776 A  6/2006
CN  1965551 A  5/2007
(Continued)

OTHER PUBLICATIONS

International Search Report dated Jun. 21, 2016 in corresponding International Application No. PCT/CN2015/090967.
(Continued)

*Primary Examiner* — Kenny A Cese
(74) *Attorney, Agent, or Firm* — Conley Rose, P.C.

(57) ABSTRACT

Embodiments of the present invention provide a method for sharing and downloading a light field image. The method includes: receiving a request for sharing a light field image with a first object; analyzing the light field image to obtain a refocusing focal point of the light field image; generating an ordinary image by using the light field image and by using the refocusing focal point as a focal point; and sharing the ordinary image with the first object. According to the method provided in the embodiments of the present invention, a refocusing focal point is automatically selected, so that a problem of selecting a refocusing focal point when a light field image is converted into an ordinary image is resolved, and the light field image is converted by using the refocusing focal point and shared with the first object.

19 Claims, 6 Drawing Sheets

(51) Int. Cl.
*G06K 9/32* (2006.01)
*G06K 9/20* (2006.01)
*H04N 5/232* (2006.01)

(52) U.S. Cl.
CPC .............. *G06K 9/2054* (2013.01); *G06K 9/32* (2013.01); *H04N 5/232* (2013.01); *G06T 2200/21* (2013.01); *G06T 2207/10052* (2013.01); *G06T 2207/30201* (2013.01)

(58) Field of Classification Search
CPC ........... G06K 9/00228; G06K 9/00288; G06K 9/2054; G06K 9/78; G06T 5/003; G06T 2200/21; G06T 2207/10052; G06T 2207/30201
See application file for complete search history.

(56) References Cited

U.S. PATENT DOCUMENTS

| | | | |
|---|---|---|---|
| 2012/0249550 A1 | 10/2012 | Akeley et al. | |
| 2013/0182900 A1* | 7/2013 | Ishii | H04N 5/23212 382/103 |
| 2013/0216199 A1* | 8/2013 | Nakajima | H04N 9/045 386/224 |
| 2013/0329068 A1* | 12/2013 | Hamanaka | H04N 5/23206 348/218.1 |
| 2014/0085488 A1 | 3/2014 | Song | |
| 2015/0016693 A1* | 1/2015 | Gattuso | H04N 5/23219 382/118 |
| 2015/0185308 A1* | 7/2015 | Wada | H04N 13/218 348/169 |
| 2015/0350531 A1* | 12/2015 | Ishida | H04N 5/23219 348/349 |

FOREIGN PATENT DOCUMENTS

| | | |
|---|---|---|
| CN | 101562701 A | 10/2009 |
| CN | 102833487 A | 12/2012 |
| CN | 103024199 A | 4/2013 |
| CN | 103139209 A | 6/2013 |
| CN | 103685726 A | 3/2014 |
| CN | 104079827 A | 10/2014 |
| CN | 104683684 A | 6/2015 |
| CN | 104780341 A | 7/2015 |

OTHER PUBLICATIONS

Machine Translation and Abstract of Chinese Publication No. CN103139209, Jun. 5, 2013, 22 pages.
Foreign Communication From a Counterpart Application, Chinese Application No. 201580082062.4, Chinese Search Report dated Apr. 25, 2019, 3 pages.
Foreign Communication From a Counterpart Application, Chinese Application No. 201580082062.4, Chinese Office fiction dated May 7, 2019, 4 pages.

* cited by examiner

METHOD AND APPARATUS FOR SHARING AND DOWNLOADING LIGHT FIELD IMAGE

CROSS-REFERENCE TO RELATED APPLICATIONS

This application is a continuation of International Application No. PCT/CN2015/090967, filed on Sep. 28, 2015, which is hereby incorporated by reference in its entirety.

TECHNICAL FIELD

The present disclosure relates to the image field, and provides a method and an apparatus for sharing and downloading a light field image.

BACKGROUND

When a common camera is used to capture an ordinary image, a focal point needs to be selected before photographing is performed. Therefore, it is required to select an accurate focal point, and this is difficult. In an embodiment of the present invention, a focal point does not need to be selected before light field image is captured, and it is only needed to photograph first. A camera captures a large amount of light data, and different focal points may be selected after photographing is performed, so that images having different focal points can be generated, and photographing is relatively flexible.

An appearance of a light field camera for generating a light field picture is almost the same as that of a common digital camera, but an internal structure is extremely different. The common camera captures light by using a main lens, and then focuses on a film or a photoreceptor behind the lens. A sum of all light forms dots on a picture, and an image is displayed. In the light field camera, between a main lens and a photoreceptor, there is a microscope array that is fully provided with tens of thousands of micro lenses. After receiving light from the main lens and before sending the light to the photoreceptor, each tiny lens array separates focusing light out, converts light data, and records the data in a digital manner. An embedded camera software operation has expanded a light field, and drop points of each light on images at different distances are tracked, so that after refocusing is performed in a digital manner, a light field image can be captured.

An image photographing process of the light field image is simple, adaptive focusing can be performed according to a requirement after photographing is performed, and an ordinary picture that satisfies any requirement can be generated. However, when sharing and downloading are performed, a sharing object and a device of a downloading subject may not support read and write of a light field picture, and this causes inconvenience for sharing and downloading the light field picture. Therefore, a light field image needs to be converted into an ordinary image. However, if a same light field picture is converted into an ordinary image, and is shared with different persons, because the persons who are shared with have different requirements for a focal point location of the light field picture, a sharer needs to manually select a refocusing focal point according to a sharing object during sharing, and this process is not intelligent and humanized.

SUMMARY

The present invention provides a method for sharing and downloading a light field image, so as to overcome inconvenience when a light field image is shared or downloaded.

According to a first aspect, an embodiment of the present invention provides a method for sharing a light field image, and the method includes: receiving a request for sharing a light field image with a first object; analyzing the light field image to obtain a refocusing focal point of the light field image; generating an ordinary image by using the light field image and by using the refocusing focal point as a focal point; and sharing the ordinary image with the first object.

In a first implementation of the first aspect, the analyzing the light field image to obtain a refocusing focal point of the light field image includes: performing face detection and facial recognition for the light field image, and setting the refocusing focal point of the light field image to a position at which a detected and recognized person that has an association relationship with the first object is in the image if the person and the first object have an association relationship.

With reference to the first aspect or the first implementation of the first aspect, in a second implementation of the first aspect, the setting the refocusing focal point of the light field image to a position at which a detected and recognized person that has an association relationship with the first object is in the image if the face image and the first object have an association relationship includes: setting the refocusing focal point of the light field image to a position at which the first object is in the image if the detected and recognized person is the first object.

With reference to the first aspect or either of the foregoing implementations of the first aspect, in a third implementation of the first aspect, before the setting the refocusing focal point of the light field image to a position at which a detected and recognized person that has an association relationship with the first object is in the image if the face image and the first object have an association relationship, the method includes: obtaining a face image of the first object.

With reference to the first aspect or any one of the foregoing implementations of the first aspect, in a fourth implementation of the first aspect, the setting the refocusing focal point of the light field image to a position at which the first object is in the image if the detected and recognized person is the first object includes: if it indicates, by comparing the face image of the first object with the detected and recognized face image, that the two images are images of a same person, setting the refocusing focal point of the light field image to the position at which the first object is in the image.

With reference to the first aspect or any one of the foregoing implementations of the first aspect, in a fifth implementation of the first aspect, the setting the refocusing focal point of the light field image to a position at which a detected and recognized person that has an association relationship with the first object is in the image if the face image and the first object have an association relationship includes: if there is a social relationship between a person corresponding to a recognized face image and the first object, setting the refocusing focal point of the light field image to a position at which the person that has a social relationship with the first object is in the image.

With reference to the first aspect or any one of the foregoing implementations of the first aspect, in a sixth implementation of the first aspect, before the setting the refocusing focal point of the light field image to a position at which a detected and recognized person that has an association relationship with the first object is in the image if the face image and the first object have an association relationship, the method includes: obtaining a face image of an object that has a social relationship with the first object;

and the setting the refocusing focal point of the light field image to a position at which a detected and recognized person that has an association relationship with the first object is in the image if the face image and the first object have an association relationship includes: if it indicates, by comparing the object that has a social relationship with the first object with the detected and recognized person, that the detected and recognized person is the object that has a social relationship with the first object, setting the refocusing focal point of the light field image to the position at which the person that has a social relationship with the first object is in the image.

With reference to the first aspect or any one of the foregoing implementations of the first aspect, in a seventh implementation of the first aspect, before the setting the refocusing focal point of the light field image to a position at which a detected and recognized person that has an association relationship with the first object is in the image if the face image and the first object have an association relationship, the method includes: obtaining multiple face images of objects that have a social relationship with the first object; and the setting the refocusing focal point of the light field image to a position at which a detected and recognized person that has an association relationship with the first object is in the image if the face image and the first object have an association relationship includes: if it indicates, by separately comparing the multiple face images of the objects that have a social relationship with the first object with the multiple detected and recognized face images, that more than one detected and recognized person is separately the object that has a social relationship with the first object, determining a most intimate object by using information of a social relationship intimate degree between the multiple objects that have a social relationship with the first object and the first object, and setting the refocusing focal point of the light field image to a position at which the most intimate object is in the image.

With reference to the first aspect or any one of the foregoing implementations of the first aspect, in an eighth implementation of the first aspect, the analyzing the light field image to obtain a refocusing focal point of the light field image includes: performing face detection for the light field image, scoring a detected face according to a preset rule, and determining that the refocusing focal point of the light field image is at a position at which a person corresponding to a face having a highest score is in the image.

With reference to any one of the first aspect or the foregoing implementations of the first aspect, in a ninth implementation of the first aspect, before the generating an ordinary image by using the light field image and by using the refocusing focal point as a focal point, the method further includes: presenting the light field image whose refocusing focal point is selected.

With reference to the first aspect or any one of the foregoing implementations of the first aspect, in a tenth implementation of the first aspect, after the presenting the light field image whose refocusing focal point is selected, and before the generating an ordinary image by using the light field image and by using the refocusing focal point as a focal point, the method further includes: receiving a confirmation instruction that the refocusing focal point is selected.

According to a second aspect, an embodiment of the present invention provides a method for downloading a light field image, and the method includes: receiving a request from a first object for downloading a light field image; analyzing the light field image to obtain a refocusing focal point of the light field image; generating an ordinary image by using the light field image and by using the refocusing focal point as a focal point; and downloading the ordinary image to the first object.

In a first implementation of the second aspect, the analyzing the light field image to obtain a refocusing focal point of the light field image includes: performing face detection and facial recognition for the light field image, and setting the refocusing focal point of the light field image to a position at which a detected and recognized person that has an association relationship with the first object is in the image if the person and the first object have an association relationship.

With reference to the second aspect or the first implementation of the second aspect, in a second implementation of the second aspect, the setting the refocusing focal point of the light field image to a position at which a detected and recognized person that has an association relationship with the first object is in the image if the face image and the first object have an association relationship includes: setting the refocusing focal point of the light field image to a position at which the first object is in the image if the detected and recognized person is the first object.

With reference to the second aspect or either of the foregoing implementations of the second aspect, in a third implementation of the second aspect, before the setting the refocusing focal point of the light field image to a position at which a detected and recognized person that has an association relationship with the first object is in the image if the face image and the first object have an association relationship, the method includes: obtaining a face image of the first object; and the setting the refocusing focal point of the light field image to a position at which the first object is in the image if the detected and recognized person is the first object includes: if it indicates, by comparing the face image of the first object with the detected and recognized face image, that the two images are images of a same person, setting the refocusing focal point of the light field image to the position at which the first object is in the image.

With reference to the second aspect or any one of the foregoing implementations of the second aspect, in a fourth implementation of the second aspect, the setting the refocusing focal point of the light field image to a position at which a detected and recognized person that has an association relationship with the first object is in the image if the face image and the first object have an association relationship includes: if there is a social relationship between a person corresponding to a recognized face image and the first object, setting the refocusing focal point of the light field image to a position at which the person that has a social relationship with the first object is in the image.

With reference to the second aspect or any one of the foregoing implementations of the second aspect, in a fifth implementation of the second aspect, before the setting the refocusing focal point of the light field image to a position at which a detected and recognized person that has an association relationship with the first object is in the image if the face image and the first object have an association relationship, the method includes: obtaining a face image of an object that has a social relationship with the first object; and the setting the refocusing focal point of the light field image to a position at which a detected and recognized person that has an association relationship with the first object is in the image if the face image and the first object have an association relationship includes: if it indicates, by comparing the object that has a social relationship with the first object with the detected and recognized person, that the detected and recognized person is the object that has a social relationship with the first object, setting the refocusing focal point of the light field image to the position at which the person that has a social relationship with the first object is in the image.

With reference to the second aspect or any one of the foregoing implementations of the second aspect, in a sixth implementation of the second aspect, before the setting the refocusing focal point of the light field image to a position at which a detected and recognized person that has an association relationship with the first object is in the image if the face image and the first object have an association relationship, the method includes: obtaining multiple face images of objects that have a social relationship with the first object; and the setting the refocusing focal point of the light field image to a position at which a detected and recognized person that has an association relationship with the first object is in the image if the face image and the first object have an association relationship includes: if it indicates, by separately comparing the multiple face images of the objects that have a social relationship with the first object with the multiple detected and recognized face images, that more than one detected and recognized person is the object that has a social relationship with the first object, determining a most intimate object by using information of a social relationship intimate degree between the multiple objects that have a social relationship with the first object and the first object, and setting the refocusing focal point of the light field image to a position at which the most intimate object is in the image.

With reference to the second aspect or any one of the foregoing implementations of the second aspect, in a seventh implementation of the second aspect, the analyzing the light field image to obtain a refocusing focal point of the light field image includes: performing face detection for the light field image, scoring a detected face according to a preset rule, and determining that the refocusing focal point of the light field image is at a position at which a person corresponding to a face having a highest score is in the image.

With reference to the second aspect or any one of the foregoing implementations of the second aspect, in an eighth implementation of the second aspect, before the generating an ordinary image by using the light field image and by using the refocusing focal point as a focal point, the method further includes: presenting the light field image whose refocusing focal point is selected.

With reference to the second aspect or any one of the foregoing implementations of the second aspect, in a ninth implementation of the second aspect, after the presenting the light field image whose refocusing focal point is selected, and before the generating an ordinary image by using the light field image and by using the refocusing focal point as a focal point, the method further includes: receiving a confirmation instruction that the refocusing focal point is selected.

According to a third aspect, an embodiment of the present invention provides an apparatus for sharing a light field image, and the apparatus includes a request receiving module, an analysis module, an image generation module, and a sharing module, where the request receiving module is configured to receive a request for sharing a light field image with a first object; the analysis module is configured to analyze the light field image to obtain a refocusing focal point of the light field image; the image generation module is configured to generate an ordinary image by using the light field image and by using the refocusing focal point as a focal point; and the sharing module is configured to share the ordinary image with the first object.

In a first implementation of the third aspect, the analysis module is specifically configured to perform face detection and facial recognition for the light field image, and set the refocusing focal point of the light field image to a position at which a detected and recognized person that has an association relationship with the first object is in the image if the person and the first object have an association relationship.

With reference to the third aspect or the first implementation of the third aspect, in a second implementation of the third aspect, the analysis module is specifically configured to perform face detection and facial recognition for the light field image, and set the refocusing focal point of the light field image to a position at which the first object is in the image if the detected and recognized person is the first object.

With reference to the third aspect or either of the foregoing implementations of the third aspect, in a third implementation of the third aspect, the apparatus further includes an image obtaining module; before the analysis module sets the refocusing focal point of the light field image to the position at which the detected and recognized person that has an association relationship with the first object is in the image if the face image and the first object have an association relationship, the image obtaining module is configured to obtain a face image of the first object; and the analysis module is specifically configured to perform face detection and facial recognition for the light field image, and if it indicates, by comparing the face image of the first object with the detected and recognized face image, that the two images are images of a same person, set the refocusing focal point of the light field image to the position at which the first object is in the image.

With reference to the third aspect or any one of the foregoing implementations of the third aspect, in a fourth implementation of the third aspect, the analysis module is specifically configured to perform face detection and facial recognition for the light field image, and if there is a social relationship between a person corresponding to a recognized face image and the first object, set the refocusing focal point of the light field image to a position at which the person that has a social relationship with the first object is in the image.

With reference to the third aspect or any one of the foregoing implementations of the third aspect, in a fifth implementation of the third aspect, the apparatus includes an image obtaining module; before the analysis module is configured to set the refocusing focal point of the light field image to the position at which the detected and recognized person that has an association relationship with the first object is in the image if the face image and the first object have an association relationship, the image obtaining module is configured to obtain a face image of an object that has a social relationship with the first object; and the analysis module is specifically configured to perform face detection and facial recognition for the light field image, and if it indicates, by comparing the object that has a social relationship with the first object with the detected and recognized person, that the detected and recognized person is the object that has a social relationship with the first object, set the refocusing focal point of the light field image to the position at which the person that has a social relationship with the first object is in the image.

With reference to the third aspect or any one of the foregoing implementations of the third aspect, in a sixth implementation of the third aspect, the apparatus includes an image obtaining module; before the analysis module is configured to set the refocusing focal point of the light field image to the position at which the detected and recognized person that has an association relationship with the first object is in the image if the face image and the first object have an association relationship, the image obtaining module is configured to obtain multiple face images of objects that have a social relationship with the first object; and the analysis module is specifically configured to perform face detection and facial recognition for the light field image, and if it indicates, by separately comparing the multiple face images of the objects that have a social relationship with the first object with the multiple detected and recognized face images, that more than one detected and recognized person is separately the object that has a social relationship with the first object, determine a most intimate object by using information of a social relationship intimate degree between the multiple objects that have a social relationship with the first object and the first object, and set the refocusing focal point of the light field image to a position at which the most intimate object is in the image.

With reference to the third aspect or any one of the foregoing implementations of the third aspect, in a seventh implementation of the third aspect, the analysis module is configured to perform face detection for the light field image, score a detected face according to a preset rule, and determine that the refocusing focal point of the light field image is at a position at which a person corresponding to a face having a highest score is in the image.

With reference to any one of the third aspect or the foregoing implementations of the third aspect, in an eighth implementation of the third aspect, the apparatus further includes an interaction module, and before the image generation module generates the ordinary image by using the refocusing focal point as the focal point and by using the light field image, the interaction module is configured to present the light field image whose refocusing focal point is selected.

With reference to the third aspect or any one of the foregoing implementations of the third aspect, in a ninth implementation of the third aspect, after the interaction module presents the light field image whose refocusing focal point is selected, and before the image generation module generates the ordinary image by using the refocusing focal point as the focal point and by using the light field image, the interaction module is further configured to receive a confirmation instruction that the refocusing focal point is selected.

According to a fourth aspect, an embodiment of the present invention provides an apparatus for downloading a light field image, and the apparatus includes a request receiving module, an analysis module, an image generation module, and a sending module, where the request receiving module is configured to receive a request from a first object for downloading a light field image; the analysis module is configured to analyze the light field image to obtain a refocusing focal point of the light field image; the image generation module is configured to generate an ordinary image by using the light field image and by using the refocusing focal point as a focal point; and the sharing module is configured to download the ordinary image to the first object.

In a first implementation of the fourth aspect, the analysis module is specifically configured to perform face detection and facial recognition for the light field image, and set the refocusing focal point of the light field image to a position at which a detected and recognized person that has an association relationship with the first object is in the image if the person and the first object have an association relationship.

With reference to the fourth aspect or the first implementation of the fourth aspect, in a second implementation of the fourth aspect, the analysis module is specifically configured to perform face detection and facial recognition for the light field image, and set the refocusing focal point of the light field image to a position at which the first object is in the image if the detected and recognized person is the first object.

With reference to the fourth aspect or either of the foregoing implementations of the fourth aspect, in a third implementation of the fourth aspect, the apparatus further includes an image obtaining module; before the analysis module sets the refocusing focal point of the light field image to the position at which the detected and recognized person that has an association relationship with the first object is in the image if the face image and the first object have an association relationship, the image obtaining module is configured to obtain a face image of the first object; and the analysis module is specifically configured to perform face detection and facial recognition for the light field image, and if it indicates, by comparing the face image of the first object with the detected and recognized face image, that the two images are images of a same person, set the refocusing focal point of the light field image to the position at which the first object is in the image.

With reference to the fourth aspect or any one of the foregoing implementations of the fourth aspect, in a fourth implementation of the fourth aspect, the analysis module is specifically configured to perform face detection and facial recognition for the light field image, and if there is a social relationship between a person corresponding to a recognized face image and the first object, set the refocusing focal point of the light field image to a position at which the person that has a social relationship with the first object is in the image.

With reference to the fourth aspect or any one of the foregoing implementations of the fourth aspect, in a fifth implementation of the fourth aspect, the apparatus includes an image obtaining module; before the analysis module is configured to set the refocusing focal point of the light field image to the position at which the detected and recognized person that has an association relationship with the first object is in the image if the face image and the first object have an association relationship, the image obtaining module is configured to obtain a face image of an object that has a social relationship with the first object; and the analysis module is specifically configured to perform face detection and facial recognition for the light field image, and if it indicates, by comparing the object that has a social relationship with the first object with the detected and recognized person, that the detected and recognized person is the object that has a social relationship with the first object, set the refocusing focal point of the light field image to the position at which the person that has an association relationship with the first object is in the image.

With reference to the fourth aspect or any one of the foregoing implementations of the fourth aspect, in a sixth implementation of the fourth aspect, the apparatus includes an image obtaining module; before the analysis module is configured to set the refocusing focal point of the light field image to the position at which the detected and recognized person that has an association relationship with the first object is in the image if the face image and the first object have an association relationship, the image obtaining module is configured to obtain multiple face images of objects that have a social relationship with the first object; and the analysis module is specifically configured to perform face detection and facial recognition for the light field image, and if it indicates, by separately comparing the multiple face images of the objects that have a social relationship with the first object with the multiple detected and recognized face images, that more than one detected and recognized person is the object that has a social relationship with the first object, determine a most intimate object by using information of a social relationship intimate degree between the multiple objects that have a social relationship with the first object and the first object, and set the refocusing focal point of the light field image to a position at which the most intimate object is in the image.

With reference to the fourth aspect or any one of the foregoing implementations of the fourth aspect, in a seventh implementation of the fourth aspect, the analysis module is configured to perform face detection for the light field image, score a detected face according to a preset rule, and determine that the refocusing focal point of the light field image is at a position at which a person corresponding to a face having a highest score is in the image.

With reference to the fourth aspect or any one of the foregoing implementations of the fourth aspect, in an eighth implementation of the fourth aspect, the apparatus further includes an interaction module, and before the image generation module generates the ordinary image by using the refocusing focal point as the focal point and by using the light field image, the interaction module is configured to present the light field image whose refocusing focal point is selected.

With reference to the fourth aspect or any one of the foregoing implementations of the fourth aspect, in a ninth implementation of the fourth aspect, after the interaction module presents the light field image whose refocusing focal point is selected, and before the image generation module generates the ordinary image by using the refocusing focal point as the focal point and by using the light field image, the interaction module is further configured to receive a confirmation instruction that the refocusing focal point is selected.

According to the method provided in embodiments of the present invention, a request for sharing or downloading a light field image to a first object is received, and the light field image is analyzed to obtain a refocusing focal point of the light field image, so that the refocusing focal point is automatically selected. An ordinary image is generated by using the light field image and by using the refocusing focal point as a focal point, and the ordinary image is shared with the first object, so that the following problem is resolved: When the light field image is shared with or downloaded to an ordinary terminal device, the ordinary device cannot recognize the light field image, and the refocusing focal point cannot be easily selected when the light field image is converted into the ordinary image. Therefore, the light field image is converted by using the refocusing focal point and shared with or downloaded to the first object.

BRIEF DESCRIPTION OF DRAWINGS

To describe the technical solutions in the embodiments of the present invention more clearly, the following briefly describes the accompanying drawings required for describing the embodiments or the prior art. Apparently, the accompanying drawings in the following description show some embodiments of the present invention, and a person of ordinary skill in the art may still derive other drawings from these accompanying drawings without creative efforts.

EMBODIMENTS OF THE PRESENT INVENTION

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 1:
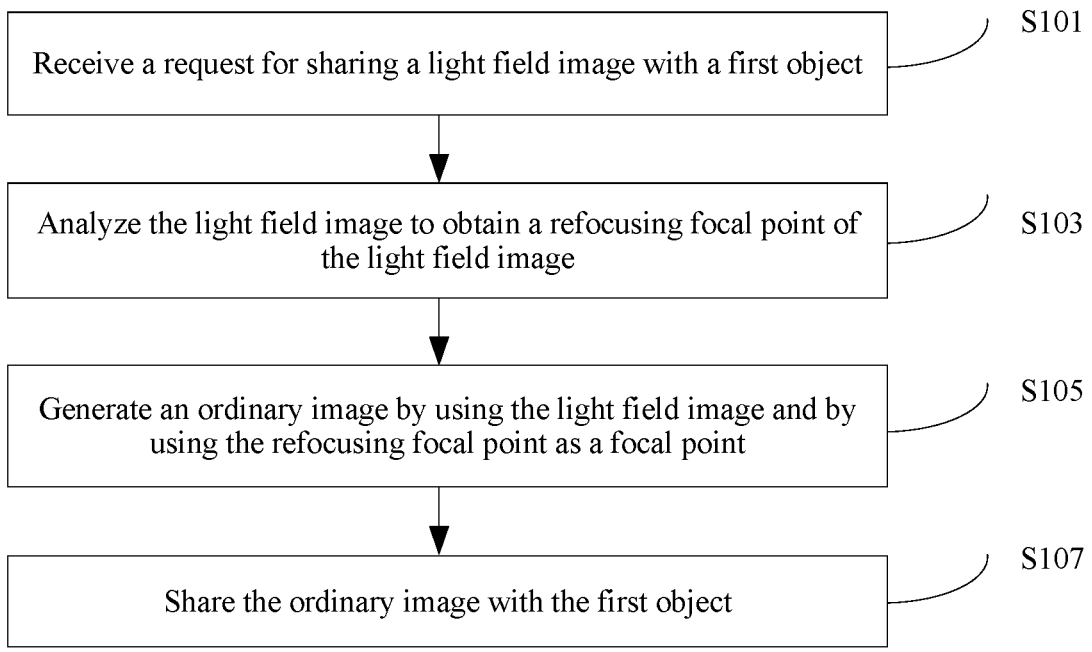
FIG. 1 is a flowchart of an embodiment of a method for sharing a light field image according to the present invention.

An embodiment of the present invention provides a method for sharing a light field image. As shown in FIG. 1, FIG. 1 provides a flowchart of an embodiment of a method for sharing a light field image according to the present invention. The method includes: S101. Receive a request for sharing a light field image with a first object; S103. Analyze the light field image to obtain a refocusing focal point of the light field image; S105. Generate an ordinary image by using the light field image and by using the refocusing focal point as a focal point; S107. Share the ordinary image with the first object.

A light field technology is applied to a light field image captured by a light field camera, so that only image composition is needed during photographing, and focusing is not needed because focusing can be performed on a computer after photographing is completed. This will change a current photographing habit. This type of camera will become an extremely useful tool for snapping a picture. Regardless of whether a snapped picture is blurred, as long as an object is within a focal length of the camera, a focal point can be randomly selected after photographing is completed because all optical information within the focal length is recorded by the camera when photographing is performed.

According to the method in this embodiment of the present invention, a terminal device shares a light field image with another terminal device. When a request for sharing a light field image with a first object is received, because a terminal device of the first object does not have a capability of processing the light field image or because communication traffic is limited when the image is transmitted to a terminal device of the first object, instead of the light field image, an ordinary image requiring less transmission traffic is selected. According to the method in this embodiment of the present invention, a refocusing focal point is automatically selected, so that a problem of selecting a refocusing focal point when a light field image is converted into an ordinary image is resolved, and the light field image is converted by using the refocusing focal point and shared with the first object.

In an embodiment of the present invention, S103: Analyze the light field image to obtain a refocusing focal point of the light field image includes: performing face detection and facial recognition for the light field image, and setting the refocusing focal point of the light field image to a position at which a detected and recognized person that has an association relationship with the first object is in the image if the person and the first object have an association relationship.

The face detection is as follows: For any given image, the image is searched by using a specific policy to determine whether the image includes a face, and if the image includes a face, information such as a location and a size of the face is returned. The facial recognition is a biometric recognition technology for performing identity identification on facial characteristic information of a person based on a face image output during face detection.

In an embodiment of the present invention, face detection and facial recognition are performed for the light field image. One or more persons are detected and recognized, whether there is an association relationship between the one or more persons and the first object is determined, a person that has an association relationship with the first object is selected, and the refocusing focal point of the light field image is set to a position at which the person that has an association relationship with the first object is in the image.

In an embodiment of the present invention, the refocusing focal point is a face center of the person, a body center of the person, or any position of a face or a body of the person. The any position of the face or the body of the person further includes an item carried on the body.

According to the method used in this embodiment of the present invention, the refocusing focal point of the light field image is set to the position at which the person that has an association relationship with the first object is in the image, and by using the person that has an association relationship with the first object as a focal point of the ordinary image, the light field image is sent to the first object. In addition, the person that has an association relationship with the first object is usually a most noticed part for the first object, and a focal point of the image is set to an attention point of a user by means of automatic focus setting, so that user experience is improved.

In an embodiment of the present invention, the setting the refocusing focal point of the light field image to a position at which a detected and recognized person that has an association relationship with the first object is in the image if the face image includes: setting the refocusing focal point of the light field image to a position at which the first object is in the image if the detected and recognized person is the first object.

According to the method used in this embodiment of the present invention, the refocusing focal point of the light field image is set to the position at which the first object is in the image, and by using the first object as a focal point of the ordinary image, the light field image is sent to the first object. In addition, the first object is usually a most noticed part for the first object, and a focal point of the image is set to an attention point of a user by means of automatic focus setting in this embodiment of the present invention, so that user experience is improved.

In an embodiment of the present invention, before the setting the refocusing focal point of the light field image to a position at which a detected and recognized person that has an association relationship with the first object is in the image if the face image and the first object have an association relationship, the method includes: S102. Obtain a face image of the first object; and the setting the refocusing focal point of the light field image to a position at which the first object is in the image if the detected and recognized person is the first object includes: if it indicates, by comparing the face image of the first object with the detected and recognized face image, that the two images are images of a same person, setting the refocusing focal point of the light field image to the position at which the first object is in the image.

According to the method in this embodiment of the present invention, the obtaining a face image of the first object includes: turning on a camera to capture an image of the first object, or searching, based on an identifier of the first object, for an image that is stored in a terminal device or a server and that is corresponding to the identifier.

In an embodiment of the present invention, the setting the refocusing focal point of the light field image to a position at which a detected and recognized person that has an association relationship with the first object is in the image if the face image and the first object have an association relationship includes: if there is a social relationship between a person corresponding to a recognized face image and the first object, setting the refocusing focal point of the light field image to a position at which the person that has a social relationship with the first object is in the image.

According to the method used in this embodiment of the present invention, the refocusing focal point of the light field image is set to the position at which the person that has a social relationship with the first object is in the image, and by using the person that has a social relationship with the first object as a focal point of the ordinary image, the light field image is sent to the first object. In addition, the person that has a social relationship with the first object is usually a most noticed part for the first object, and a focal point of the image is set to an attention point of a user by means of automatic focus setting in this embodiment of the present invention, so that user experience is improved.

In this embodiment of the present invention, the person that has a social relationship with the first object includes a relative, a friend, or a colleague. A social relationship may be obtained by using a social network, or may be obtained by using information of a user's address book.

Figure 2:
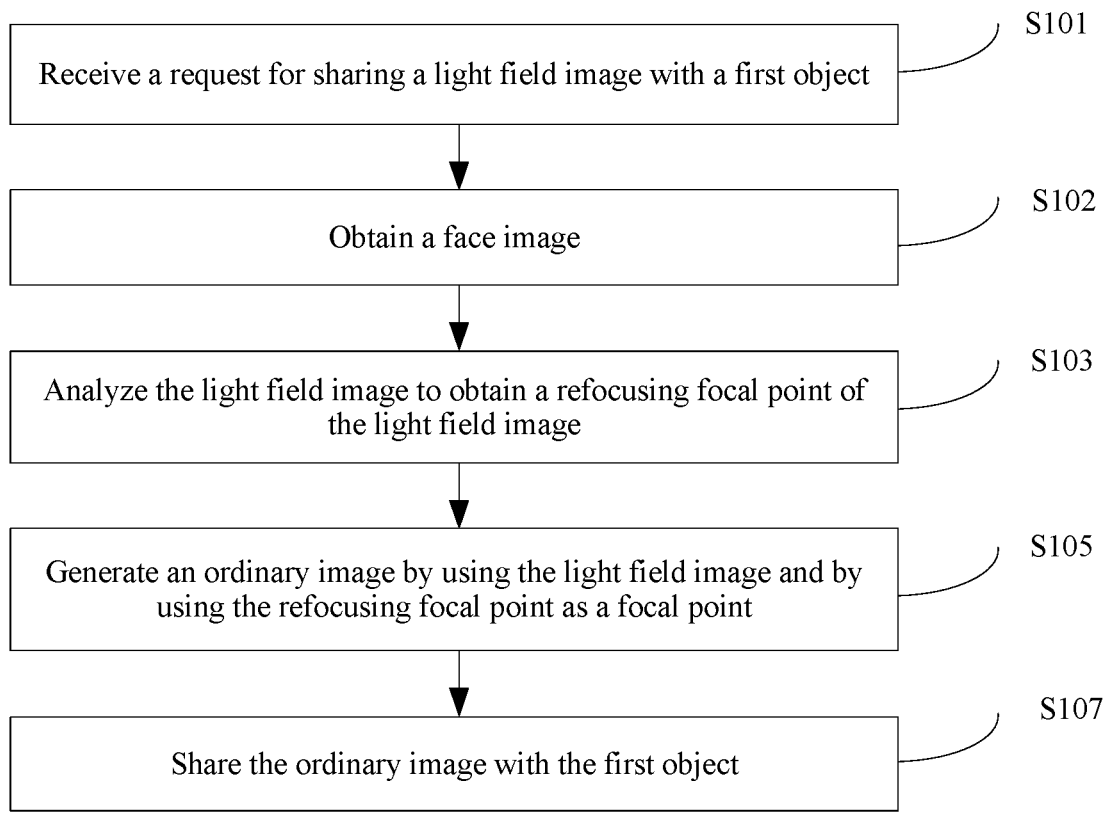
FIG. 2 is a flowchart of another embodiment of a method for sharing a light field image according to the present invention.

In an embodiment of the present invention, as shown in FIG. 2, FIG. 2 provides a flowchart of another embodiment of the present invention. Before the setting the refocusing focal point of the light field image to a position at which a detected and recognized person that has an association relationship with the first object is in the image if the face image and the first object have an association relationship, the method includes: S102. Obtain a face image of an object that has a social relationship with the first object; and the setting the refocusing focal point of the light field image to a position at which a detected and recognized person that has an association relationship with the first object is in the image if the face image and the first object have an association relationship includes: if it indicates, by comparing the object that has a social relationship with the first object with the detected and recognized person, that the detected and recognized person is the object that has a social relationship with the first object, setting the refocusing focal point of the light field image to the position at which the person that has a social relationship with the first object is in the image.

In this embodiment of the present invention, the obtaining a face image of an object that has a social relationship with the first object includes: obtaining the face image of the object that has a social relationship with the first object from a social network for the first object.

In an embodiment of the present invention, before the setting the refocusing focal point of the light field image to a position at which a detected and recognized person that has an association relationship with the first object is in the image if the face image and the first object have an association relationship, the method includes: obtaining multiple face images of objects that have a social relationship with the first object; and the setting the refocusing focal point of the light field image to a position at which a detected and recognized person that has an association relationship with the first object is in the image if the face image and the first object have an association relationship includes: if it indicates, by separately comparing the multiple face images of the objects that have a social relationship with the first object with the multiple detected and recognized face images, that more than one detected and recognized person is separately the object that has a social relationship with the first object, determining a most intimate object by using information of a social relationship intimate degree between the multiple objects that have a social relationship with the first object and the first object, and setting the refocusing focal point of the light field image to a position at which the most intimate object is in the image.

In this embodiment of the present invention, the determining a most intimate object by using information of a social relationship intimate degree between the multiple objects that have a social relationship with the first object and the first object includes: determining that an object is the most intimate object, where the object has a most frequent social relationship with the first object in an object social relationship of the multiple objects that have a social relationship with the first object; or when the present invention is performed by a terminal device of a second object, determining that an object is the most intimate object, where the object has a most frequent social relationship with the first object and the second object in an object social relationship of the multiple objects that have a social relationship with the first object. The method is not limited to the foregoing methods.

In an embodiment of the present invention, the analyzing the light field image to obtain a refocusing focal point of the light field image includes: performing face detection for the light field image, scoring a detected face according to a preset rule, and determining that the refocusing focal point of the light field image is at a position at which a person corresponding to a face having a highest score is in the image.

According to the method used in this embodiment of the present invention, the detected face is scored according to the preset rule, and it is determined that the refocusing focal point of the light field image is at the position at which the person corresponding to the face having the highest score is in the image, so that the refocusing focal point is automatically determined, and this simplifies a user's selection operation.

In an embodiment of the present invention, the scoring according to a preset rule includes: scoring the detected face according to a preset face score rule, and determining that the refocusing focal point of the light field image is at a position at which a person corresponding to a face having a highest face score is in the image.

According to the method used in this embodiment of the present invention, the detected face is scored according to the preset face score rule, and it is determined that the refocusing focal point of the light field image is at the position at which the person corresponding to the face having the highest face score is in the image, so that the method may be used in a process of generating a news image and a public image.

In an embodiment of the present invention, the scoring according to a preset rule includes: scoring the detected face according to a face size rule, and determining that the refocusing focal point of the light field image is at a position at which a person corresponding to a biggest face is in the image.

According to the method used in this embodiment of the present invention, the detected face is scored according to the face size rule, and it is determined that the refocusing focal point of the light field image is at the position at which the person corresponding to the biggest face is in the image, so that the method may be used in a process of generating a news image and a public image.

In an embodiment of the present invention, the scoring according to a preset rule includes: scoring the detected face according to a post rank corresponding to the face, and determining that the refocusing focal point of the light field image is at a position at which a person corresponding to a face of the person that has a highest post rank is in the image.

According to the method used in this embodiment of the present invention, the detected face is scored according to the post rank rule, and it is determined that the refocusing focal point of the light field image is at the position at which the person corresponding to the face having the highest post rank is in the image, so that the method may be used in a process of generating a news image and a public image.

In an embodiment of the present invention, the scoring according to a preset rule includes: scoring the detected face according to a face expression, and determining that the refocusing focal point of the light field image is at a position at which a person corresponding to a face of the person whose expression is the best (for example, smiling most happily or crying most sadly) is in the image.

In an embodiment of the present invention, the scoring according to a preset rule includes: scoring the detected face according to public attention of the face, and determining that the refocusing focal point of the light field image is at a position at which a person corresponding to a face of the person that has highest public attention is in the image.

In an embodiment of the present invention, the scoring according to a preset rule includes: scoring the detected face according to a motion range corresponding to the face, and determining that the refocusing focal point of the light field image is at a position at which a person corresponding to a face of the person that has a largest motion range is in the image.

In an embodiment of the present invention, before or at the same time of S105: Generate an ordinary image by using the light field image and by using the refocusing focal point as a focal point, the method further includes: S1041. Present the light field image whose refocusing focal point is selected. As shown in FIG. 2, FIG. 2 provides a flowchart of an embodiment of the present invention.

According to the method used in this embodiment of the present invention, before the ordinary image is generated by using the light field image, the light field image whose refocusing focal point is selected is presented, and this is similar to that determining of a focal point for generating the ordinary image is presented in advance, so that a process of generating the ordinary image is also more intuitive.

In an embodiment of the present invention, after the presenting the light field image whose refocusing focal point is selected, and before the generating an ordinary image by using the light field image and by using the refocusing focal point as a focal point, the method further includes: S1043. Receive a confirmation instruction that the refocusing focal point is selected.

Because there may be an inaccurate determining process during automatic refocusing focal point determining, according to the method used in this embodiment of the present invention, before the generating an ordinary image by using the light field image and by using the refocusing focal point as a focal point, the confirmation instruction that the refocusing focal point is selected is received. Therefore, by means of confirmation of a user, the inaccurate determining process of a focal point is overcome, and user experience is improved.

Figure 3:
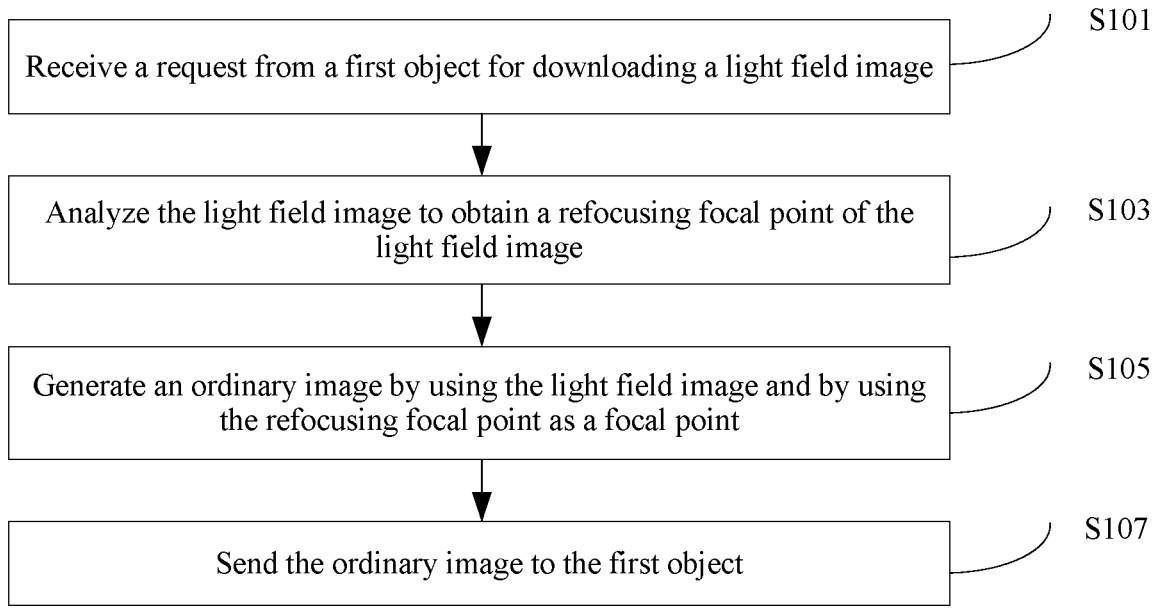
FIG. 3 is a flowchart of an embodiment of a method for downloading a light field image according to the present invention.
Figure 4:
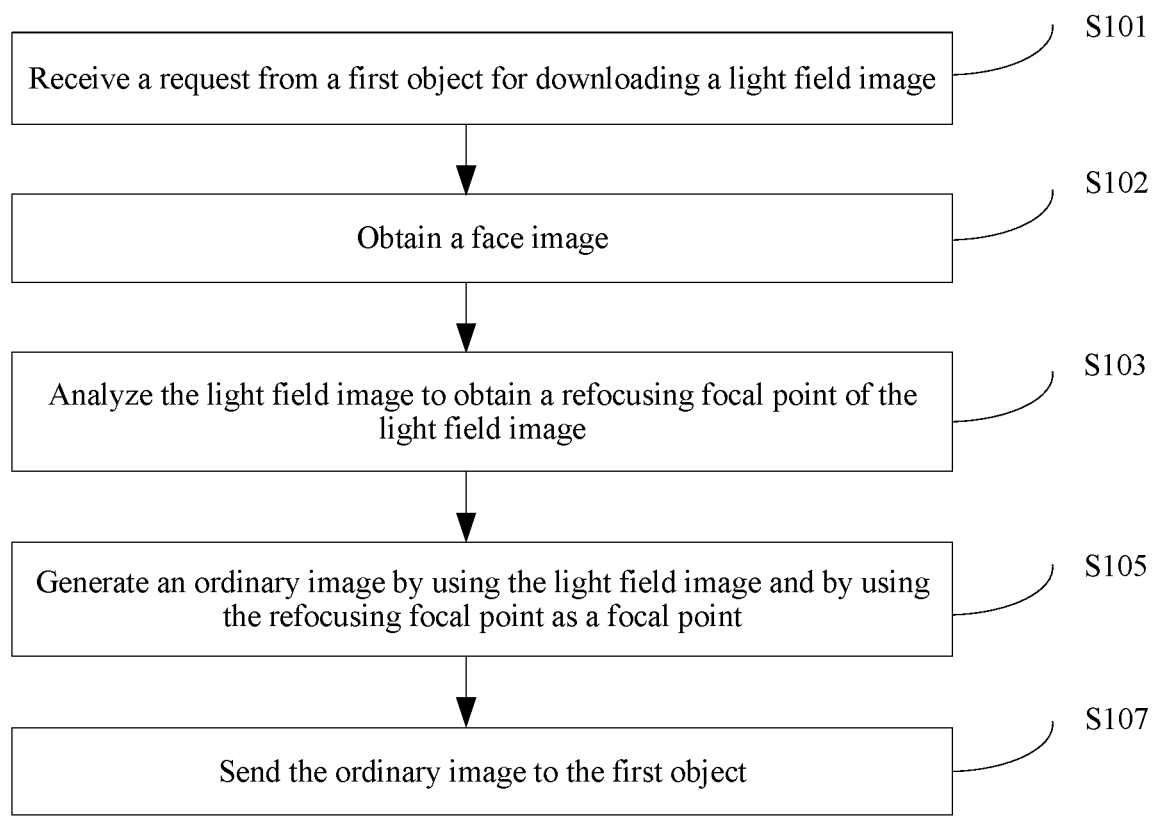
FIG. 4 is a flowchart of another embodiment of a method for downloading a light field image according to the present invention.

An embodiment of the present invention provides a method for downloading a light field image. As shown in FIG. 3, FIG. 3 provides a flowchart of an embodiment of a method for downloading a light field image according to the present invention. The method includes: S301. Receive a request from a first object for downloading a light field image. S303. Analyze the light field image to obtain a refocusing focal point of the light field image. S305. Generate an ordinary image by using the light field image and by using the refocusing focal point as a focal point. S307. Download the ordinary image to the first object.

In a social network or a web disk, an image uploading user uploads a light field image to the social network; however, a terminal device of the first object is able to download only an ordinary image because the terminal device of the first object may support only an ordinary image or because of a network traffic limit. According to the method provided in this embodiment of the present invention, a method for automatically setting a refocusing focal point in a process of converting a light field image into an ordinary image is provided in a network downloading process.

In an embodiment of the present invention, S303: Analyze the light field image to obtain a refocusing focal point of the light field image includes: performing face detection and facial recognition for the light field image, and setting the refocusing focal point of the light field image to a position at which a detected and recognized person that has an association relationship with the first object is in the image if the person and the first object have an association relationship.

The face detection is as follows: For any given image, the image is searched by using a specific policy to determine whether the image includes a face, and if the image includes a face, information such as a location and a size of the face is returned. The facial recognition is a biometric recognition technology for performing identity identification on facial characteristic information of a person based on a face image output during face detection.

In an embodiment of the present invention, face detection and facial recognition are performed for the light field image. One or more persons are detected and recognized, whether there is an association relationship between the one or more persons and the first object is determined, a person that has an association relationship with the first object is selected, and the refocusing focal point of the light field image is set to a position at which the person that has an association relationship with the first object is in the image.

In an embodiment of the present invention, the refocusing focal point is a face center of the person, a body center of the person, or any position of a face or a body of the person. The any position of the face or the body of the person further includes an item carried on the body.

In an embodiment of the present invention, the setting the refocusing focal point of the light field image to a position at which a detected and recognized person that has an association relationship with the first object is in the image if the face image and the first object have an association relationship includes: setting the refocusing focal point of the light field image to a position at which the first object is in the image if the detected and recognized person is the first object.

According to the method used in this embodiment of the present invention, the refocusing focal point of the light field image is set to the position at which the first object is in the image, and by using the first object as a focal point of the ordinary image, the light field image is sent to the first object. In addition, the first object is usually a most noticed part for the first object, and a focal point of the image is set to an attention point of a user by means of automatic focus setting in this embodiment of the present invention, so that user experience is improved.

In an embodiment of the present invention, before the setting the refocusing focal point of the light field image to a position at which a detected and recognized person that has an association relationship with the first object is in the image if the face image and the first object have an association relationship, the method includes: obtaining a face image of the first object; and the setting the refocusing focal point of the light field image to a position at which the first object is in the image if the detected and recognized person is the first object includes: if it indicates, by comparing the face image of the first object with the detected and recognized face image, that the two images are images of a same person, setting the refocusing focal point of the light field image to the position at which the first object is in the image.

According to the method in this embodiment of the present invention, the obtaining a face image of the first object includes: turning on a camera to capture an image of the first object, or searching, based on a name of the first object, for an image that is stored in a terminal device or a server and that is corresponding to the name.

In an embodiment of the present invention, the setting the refocusing focal point of the light field image to a position at which a detected and recognized person that has an association relationship with the first object is in the image if the face image and the first object have an association relationship includes: if there is a social relationship between a person corresponding to a recognized face image and the first object, setting the refocusing focal point of the light field image to a position at which the person that has a social relationship with the first object is in the image.

According to the method used in this embodiment of the present invention, the refocusing focal point of the light field image is set to the position at which the person that has a social relationship with the first object is in the image, and by using the person that has a social relationship with the first object as a focal point of the ordinary image, the light field image is sent to the first object. In addition, the person that has a social relationship with the first object is usually a most noticed part for the first object, and a focal point of the image is set to an attention point of a user by means of automatic focus setting in this embodiment of the present invention, so that user experience is improved.

In an embodiment of the present invention, before the setting the refocusing focal point of the light field image to a position at which a detected and recognized person that has an association relationship with the first object is in the image if the face image and the first object have an association relationship, the method includes: obtaining a face image of an object that has a social relationship with the first object; and the setting the refocusing focal point of the light field image to a position at which a detected and recognized person that has an association relationship with the first object is in the image if the face image and the first object have an association relationship includes: if it indicates, by comparing the object that has a social relationship with the first object with the detected and recognized person, that the detected and recognized person is the object that has a social relationship with the first object, setting the refocusing focal point of the light field image to the position at which the person that has a social relationship with the first object is in the image.

In an embodiment of the present invention, before the setting the refocusing focal point of the light field image to a position at which a detected and recognized person that has an association relationship with the first object is in the image if the face image and the first object have an association relationship, the method includes: obtaining multiple face images of objects that have a social relationship with the first object; and the setting the refocusing focal point of the light field image to a position at which a detected and recognized person that has an association relationship with the first object is in the image if the face image and the first object have an association relationship includes: if it indicates, by separately comparing the multiple face images of the objects that have a social relationship with the first object with the multiple detected and recognized face images, that more than one detected and recognized person is the object that has a social relationship with the first object, determining a most intimate object by using information of a social relationship intimate degree between the multiple objects that have a social relationship with the first object and the first object, and setting the refocusing focal point of the light field image to a position at which the most intimate object is in the image.

In an embodiment of the present invention, the analyzing the light field image to obtain a refocusing focal point of the light field image includes: performing face detection for the light field image, scoring a detected face according to a preset rule, and determining that the refocusing focal point of the light field image is at a position at which a person corresponding to a face having a highest score is in the image.

According to the method used in this embodiment of the present invention, the detected face is scored according to the preset rule, and it is determined that the refocusing focal point of the light field image is at the position at which the person corresponding to the face having the highest score is in the image, so that the refocusing focal point is automatically determined, and this simplifies a user's selection operation.

In an embodiment of the present invention, the scoring according to a preset rule includes: scoring the detected face according to a preset face score rule, and determining that the refocusing focal point of the light field image is at a position at which a person corresponding to a face having a highest face score is in the image.

According to the method used in this embodiment of the present invention, the detected face is scored according to the preset face score rule, and it is determined that the refocusing focal point of the light field image is at the position at which the person corresponding to the face having the highest face score is in the image, so that the method may be used in a process of generating a news image and a public image.

In an embodiment of the present invention, the scoring according to a preset rule includes: scoring the detected face according to a face size rule, and determining that the refocusing focal point of the light field image is at a position at which a person corresponding to a biggest face is in the image.

According to the method used in this embodiment of the present invention, the detected face is scored according to the face size rule, and it is determined that the refocusing focal point of the light field image is at the position at which the person corresponding to the biggest face is in the image, so that the method may be used in a process of generating a news image and a public image.

In an embodiment of the present invention, the scoring according to a preset rule includes: scoring the detected face according to a post rank corresponding to the face, and determining that the refocusing focal point of the light field image is at a position at which a person corresponding to a face of the person that has a highest post rank is in the image.

According to the method used in this embodiment of the present invention, the detected face is scored according to the post rank rule, and it is determined that the refocusing focal point of the light field image is at the position at which the person corresponding to the face having the highest post rank is in the image, so that the method may be used in a process of generating a news image and a public image.

In an embodiment of the present invention, before S305: Generate an ordinary image by using the light field image and by using the refocusing focal point as a focal point, the method further includes: S3041. Present the light field image whose refocusing focal point is selected.

According to the method used in this embodiment of the present invention, before the ordinary image is generated by using the light field image, the light field image whose refocusing focal point is selected is presented, and this is similar to that determining of a focal point for generating the ordinary image is presented in advance, so that a process of generating the ordinary image is also more intuitive.

In an embodiment of the present invention, after the presenting the light field image whose refocusing focal point is selected, and before the generating an ordinary image by using the light field image and by using the refocusing focal point as a focal point, the method further includes: S3043. Receive a confirmation instruction that the refocusing focal point is selected.

Because there may be an inaccurate determining process during automatic refocusing focal point determining, according to the method used in this embodiment of the present invention, before the generating an ordinary image by using the light field image and by using the refocusing focal point as a focal point, the confirmation instruction that the refocusing focal point is selected is received. Therefore, by means of confirmation of a user, the inaccurate determining process of a focal point is overcome, and user experience is improved.

Figure 5:
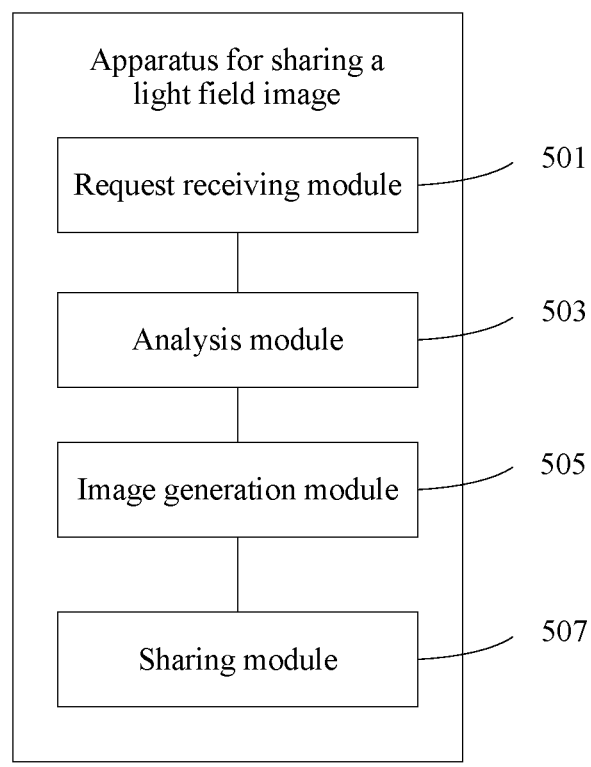
FIG. 5 is a structural diagram of an embodiment of an apparatus for sharing a light field image according to the present invention.

An embodiment of the present invention provides an apparatus for sharing a light field image. As shown in FIG. 5, FIG. 5 provides a structural diagram of an embodiment of the present invention. The apparatus includes a request receiving module 501, an analysis module 503, an image generation module 505, and a sharing module 507. The request receiving module 501 is configured to receive a request for sharing a light field image with a first object; the analysis module 503 is configured to analyze the light field image to obtain a refocusing focal point of the light field image; the image generation module 505 is configured to generate an ordinary image by using the light field image and by using the refocusing focal point as a focal point; and the sharing module 507 is configured to share the ordinary image with the first object.

In an embodiment of the present invention, the analysis module 503 is specifically configured to perform face detection and facial recognition for the light field image, and set the refocusing focal point of the light field image to a position at which a detected and recognized person that has an association relationship with the first object is in the image if the person and the first object have an association relationship.

In an embodiment of the present invention, the analysis module 503 is specifically configured to perform face detection and facial recognition for the light field image, and set the refocusing focal point of the light field image to a position at which the first object is in the image if the detected and recognized person is the first object.

Figure 6:
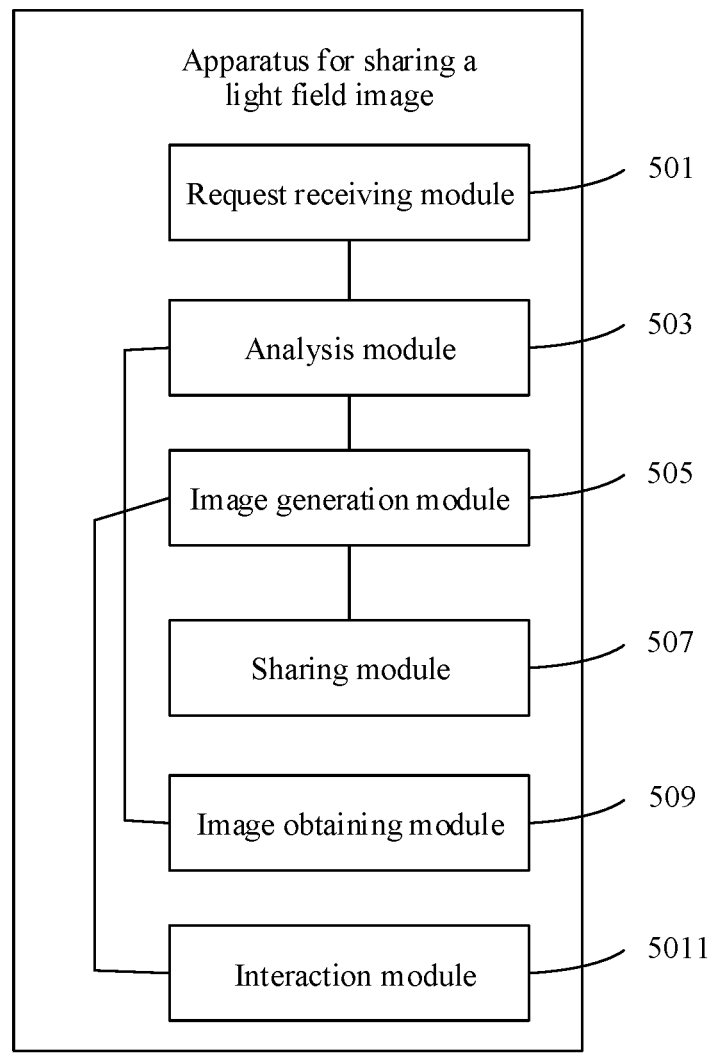
FIG. 6 is a structural diagram of another embodiment of an apparatus for sharing a light field image according to the present invention.

In an embodiment of the present invention, as shown in FIG. 6, FIG. 6 provides a structural diagram of an embodiment of the present invention. The apparatus further includes an image obtaining module 509. Before the analysis module 503 sets the refocusing focal point of the light field image to the position at which the detected and recognized person that has an association relationship with the first object is in the image if the face image and the first object have an association relationship, the image obtaining module 509 is configured to obtain a face image of the first object; and the analysis module 503 is specifically configured to perform face detection and facial recognition for the light field image, and if it indicates, by comparing the face image of the first object with the detected and recognized face image, that the two images are images of a same person, set the refocusing focal point of the light field image to the position at which the first object is in the image.

In an embodiment of the present invention, the analysis module 503 is specifically configured to perform face detection and facial recognition for the light field image, and if there is a social relationship between a person corresponding to a recognized face image and the first object, set the refocusing focal point of the light field image to a position at which the person that has a social relationship with the first object is in the image.

In an embodiment of the present invention, the apparatus includes an image obtaining module 509. Before the analysis module 503 is configured to set the refocusing focal point of the light field image to the position at which the detected and recognized person that has an association relationship with the first object is in the image if the face image and the first object have an association relationship, the image obtaining module 509 is configured to obtain a face image of an object that has a social relationship with the first object; and the analysis module 503 is specifically configured to perform face detection and facial recognition for the light field image, and if it indicates, by comparing the object that has a social relationship with the first object with the detected and recognized person, that the detected and recognized person is the object that has a social relationship with the first object, set the refocusing focal point of the light field image to the position at which the person that has a social relationship with the first object is in the image.

In an embodiment of the present invention, the apparatus includes an image obtaining module 509. Before the analysis module 503 is configured to set the refocusing focal point of the light field image to the position at which the detected and recognized person that has an association relationship with the first object is in the image if the face image and the first object have an association relationship, the image obtaining module 509 is configured to obtain multiple face images of objects that have a social relationship with the first object; and the analysis module 503 is specifically configured to perform face detection and facial recognition for the light field image, and if it indicates, by separately comparing the multiple face images of the objects that have a social relationship with the first object with the multiple detected and recognized face images, that more than one detected and recognized person is separately the object that has a social relationship with the first object, determine a most intimate object by using information of a social relationship intimate degree between the multiple objects that have a social relationship with the first object and the first object, and set the refocusing focal point of the light field image to a position at which the most intimate object is in the image.

In an embodiment of the present invention, the analysis module 503 is configured to perform face detection for the light field image, score a detected face according to a preset rule, and determine that the refocusing focal point of the light field image is at a position at which a person corresponding to a face having a highest score is in the image.

In an embodiment of the present invention, the apparatus further includes an interaction module 5011. Before the image generation module 505 generates the ordinary image by using the refocusing focal point as the focal point and by using the light field image, the interaction module 5011 is configured to present the light field image whose refocusing focal point is selected.

In an embodiment of the present invention, after the interaction module 5011 presents the light field image whose refocusing focal point is selected, and before the image generation module 505 generates the ordinary image by using the refocusing focal point as the focal point and by using the light field image, the interaction module 5011 is further configured to receive a confirmation instruction that the refocusing focal point is selected.

Figure 7:
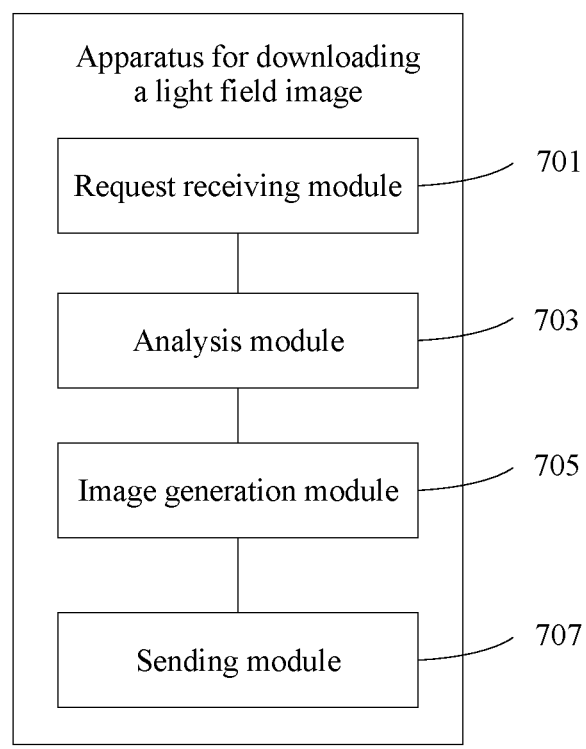
FIG. 7 is a structural diagram of an embodiment of an apparatus for downloading a light field image according to the present invention.

An embodiment of the present invention provides an apparatus for downloading a light field image. As shown in FIG. 7, FIG. 7 provides a structural diagram of an embodiment of the present invention. The apparatus includes a request receiving module 701, an analysis module 703, an image generation module 705, and a sending module 707. The request receiving module 701 is configured to receive a request from a first object for downloading a light field image; the analysis module 703 is configured to analyze the light field image to obtain a refocusing focal point of the light field image; the image generation module 705 is configured to generate an ordinary image by using the light field image and by using the refocusing focal point as a focal point; and the sharing module 707 is configured to download the ordinary image to the first object.

In an embodiment of the present invention, the analysis module 703 is specifically configured to perform face detection and facial recognition for the light field image, and set the refocusing focal point of the light field image to a position at which a detected and recognized person that has an association relationship with the first object is in the image if the person and the first object have an association relationship.

In an embodiment of the present invention, the analysis module 703 is specifically configured to perform face detection and facial recognition for the light field image, and set the refocusing focal point of the light field image to a position at which the first object is in the image if the detected and recognized person is the first object.

Figure 8:
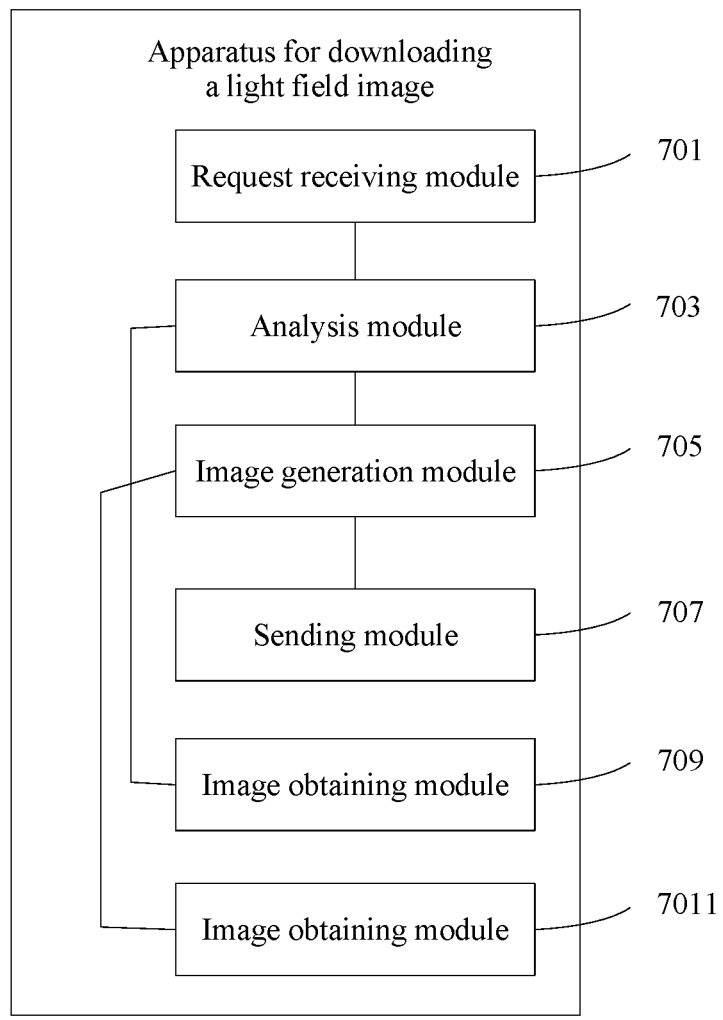
FIG. 8 is a structural diagram of an embodiment of an apparatus for sharing a light field image according to the present invention.

In an embodiment of the present invention, as shown in FIG. 8, FIG. 8 provides a structural diagram of an embodiment of the present invention. The apparatus further includes an image obtaining module 709. Before the analysis module 703 sets the refocusing focal point of the light field image to the position at which the detected and recognized person that has an association relationship with the first object is in the image if the face image and the first object have an association relationship, the image obtaining module 709 is configured to obtain a face image of the first object; and the analysis module 703 is specifically configured to perform face detection and facial recognition for the light field image, and if it indicates, by comparing the face image of the first object with the detected and recognized face image, that the two images are images of a same person, set the refocusing focal point of the light field image to the position at which the first object is in the image.

In an embodiment of the present invention, the analysis module 703 is specifically configured to perform face detection and facial recognition for the light field image, and if there is a social relationship between a person corresponding to a recognized face image and the first object, set the refocusing focal point of the light field image to a position at which the person that has a social relationship with the first object is in the image.

In an embodiment of the present invention, the apparatus includes an image obtaining module 709. Before the analysis module 703 is configured to set the refocusing focal point of the light field image to the position at which the detected and recognized person that has an association relationship with the first object is in the image if the face image and the first object have an association relationship, the image obtaining module 709 is configured to obtain a face image of an object that has a social relationship with the first object; and the analysis module 703 is specifically configured to perform face detection and facial recognition for the light field image, and if it indicates, by comparing the object that has a social relationship with the first object with the detected and recognized person, that the detected and recognized person is the object that has a social relationship with the first object, set the refocusing focal point of the light field image to the position at which the person that has a social relationship with the first object is in the image.

In an embodiment of the present invention, the apparatus includes an image obtaining module 709. Before the analysis module 703 is configured to set the refocusing focal point of the light field image to the position at which the detected and recognized person that has an association relationship with the first object is in the image if the face image and the first object have an association relationship, the image obtaining module 709 is configured to obtain multiple face images of objects that have a social relationship with the first object; and the analysis module 703 is specifically configured to perform face detection and facial recognition for the light field image, and if it indicates, by separately comparing the multiple face images of the objects that have a social relationship with the first object with the multiple detected and recognized face images, that more than one detected and recognized person is the object that has a social relationship with the first object, determine a most intimate object by using information of a social relationship intimate degree between the multiple objects that have a social relationship with the first object and the first object, and set the refocusing focal point of the light field image to a position at which the most intimate object is in the image.

In an embodiment of the present invention, the analysis module 703 is configured to perform face detection for the light field image, score a detected face according to a preset rule, and determine that the refocusing focal point of the light field image is at a position at which a person corresponding to a face having a highest score is in the image.

In an embodiment of the present invention, the apparatus further includes an interaction module 7011. Before the image generation module 705 generates the ordinary image by using the refocusing focal point as the focal point and by using the light field image, the interaction module 7011 is configured to present the light field image whose refocusing focal point is selected.

In an embodiment of the present invention, after the interaction module 7011 presents the light field image whose refocusing focal point is selected, and before the image generation module 705 generates the ordinary image by using the refocusing focal point as the focal point and by using the light field image, the interaction module 7011 is further configured to receive a confirmation instruction that the refocusing focal point is selected.

Figure 9:
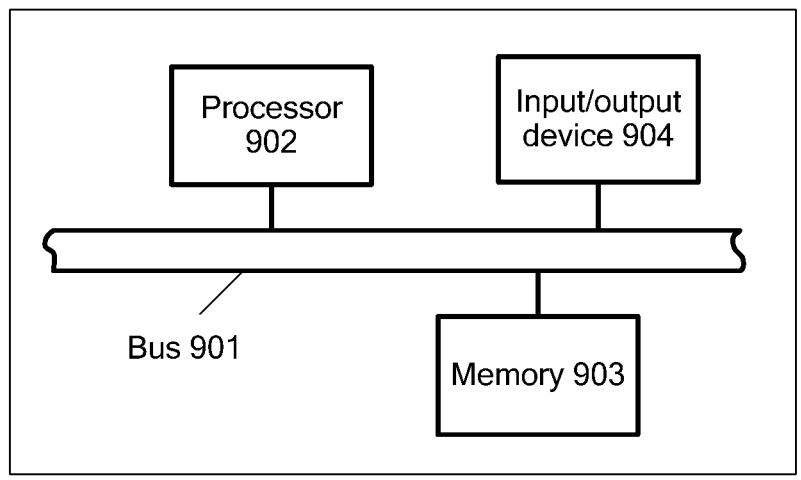
FIG. 9 is a structural diagram of an embodiment of a computer system for sharing and downloading a light field image according to the present invention.

An embodiment of the present invention provides a computer system for sharing and downloading a light field image. As shown in FIG. 9, FIG. 9 provides a structural diagram of an embodiment of the present invention. The computer system includes a bus 901, a processor 902, a memory 903, and an input/output device 904. The processor, the memory, and the input/output device are connected by using the bus. The memory is configured to store data and code. The processor is coupled to the memory, and is configured to implement the following method by invoking the data and the code in the memory: receiving a request for sharing a light field image with a first object; analyzing the light field image to obtain a refocusing focal point of the light field image; generating an ordinary image by using the light field image and by using the refocusing focal point as a focal point; and sharing the ordinary image with the first object.

The processor is coupled to the memory, and is configured to implement the following method by invoking the data and the code in the memory: receiving a request from a first object for downloading a light field image; analyzing the light field image to obtain a refocusing focal point of the light field image; generating an ordinary image by using the light field image and by using the refocusing focal point as a focal point; and downloading the ordinary image to the first object.

In an embodiment of the present invention, the input/output device 904 includes a text input device, such as a keyboard, a touchscreen, and a mouse, a camera, a touch action module, and the like. The processor that is coupled to the memory is further configured to invoke a program or data in the memory, so as to control the camera to collect an image of the first object, where the first object is one part of a body; and control the touch action module to apply a touch signal to the first object.

A person skilled in the art may understand that the accompanying drawings are merely schematic diagrams of embodiments, and modules or processes in the accompanying drawings are not necessarily required for implementing the present invention.

A person skilled in the art may understand that the modules in the apparatuses provided in the embodiments may be arranged in the apparatuses in a distributed manner according to the description of the embodiments, or may be arranged in one or more apparatuses which are different from those described in the embodiments. The modules in the foregoing embodiments may be combined into one module, or split into a plurality of submodules.

A person of ordinary skill in the art may understand that all or a part of the steps of the methods in the embodiments may be implemented by a program instructing relevant hardware. The program may be stored in a computer readable storage medium, including a ROM, a RAM, a magnetic disk, or an optical disc.

Finally, it should be noted that the foregoing embodiments are merely intended for describing the technical solutions of the present invention but not for limiting the present invention. Although the present invention is described in detail with reference to the foregoing embodiments, a person of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A method for sharing a light field image, comprising:
   receiving, from a first object, a request for sharing the light field image with the first object;
   performing face detection on the light field image to detect whether the light field image comprises a detected person;
   analyzing the light field image to obtain a refocusing focal point of the light field image by:
     performing facial recognition on the detected person in the light field image to detect whether the detected person comprises a recognized person;
     obtaining multiple facial images of objects that have a social relationship with the first object; and
     setting the refocusing focal point of the light field image to a position at which a facial image of the recognized person that is associated with the first object is in the light field image when at least one of the multiple facial images and the first object are associated, which comprises:
       determining a most intimate object using information of a social relationship intimate degree between at least one of the multiple facial images and the first object when a separate comparison of the multiple facial images with multiple recognized persons indicates that more than one recognized person is one of the objects that has a social relationship with the first object; and
       setting the refocusing focal point of the light field image to a second position at which the most intimate object is in the light field image;
   generating an ordinary image using the light field image and the refocusing focal point as a focal point; and
   providing the ordinary image to the first object so as to share the ordinary image.

2. The method of claim 1, further comprising setting the refocusing focal point of the light field image to the position at which the first object is in the light field image when the recognized person is the first object.

3. The method of claim 2, further comprising obtaining a second facial image of the first object before setting the refocusing focal point of the light field image to the position at which the recognized person is in the light field image when the facial image is associated with the first object.

4. The method of claim 3, further comprising setting the refocusing focal point of the light field image to the position at which the first object is in the light field image when a comparison of the second facial image with the facial image indicates images of a same person.

5. The method of claim 1, wherein the setting further comprises setting the refocusing focal point of the light field image to a second position at which the recognized person has a social relationship with the first object and is in the light field image.

6. The method of claim 5, wherein before setting the refocusing focal point of the light field image to the second position at which the recognized person is associated with the first object, the method further comprises obtaining a second facial image of an object that has a social relationship with the first object.

7. The method of claim 6, further comprising setting the refocusing focal point of the light field image to the position at which the recognized person has the social relationship with the first object and is in the light field image when a comparison of the first object with the recognized person indicates that the recognized person is the object that has the social relationship with the first object.

8. The method of claim 1, wherein the analyzing comprises:
   scoring a detected face in the facial image according to a preset rule; and
   determining that the refocusing focal point of the light field image is at the position at which a person corresponding to the detected face having a highest score is in the light field image.

9. The method of claim 1, wherein before using the light field image to generate the ordinary image, the method further comprises presenting the light field image whose refocusing focal point is selected.

10. The method of claim 9, wherein after the presenting and before the generating, the method further comprises receiving a confirmation instruction that the refocusing focal point is selected.

11. An apparatus for sharing a light field image, comprising:
   a memory storing code; and
   a processor coupled to the memory and configured to execute the code, wherein the code causes the processor to be configured to:
     receive, from a first object, a request to share the light field image with the first object;
     perform face detection on the light field image to detect whether the light field image comprises a detected person;
     analyze the light field image to obtain a refocusing focal point of the light field image by:
       performing facial recognition on the detected person in the light field image to detect whether the detected person comprises a recognized person;

obtaining multiple facial images of objects that have a social relationship with the first object; and setting the refocusing focal point of the light field image to a position at which a facial image of the recognized person that is associated with the first object is in the light field image when at least one of the multiple facial images and the first object are associated, which comprises:

determining a most intimate object using information of a social relationship intimate degree between at least one of the multiple facial images and the first object when a separate comparison of the multiple facial images with multiple recognized persons indicates that more than one recognized person is one of the objects that has a social relationship with the first object; and setting the refocusing focal point of the light field image to a second position at which the most intimate object is in the light field image;

generate an ordinary image using the light field image and the refocusing focal point as a focal point; and provide the ordinary image to the first object so as to share the ordinary image.

12. The apparatus of claim 11, wherein the code further causes the processor to be configured to set the refocusing focal point of the light field image to the position at which the first object is in the light field image when the recognized person is the first object.

13. The apparatus of claim 11, wherein the code further causes the processor to be configured to:

obtain a second facial image of the first object before setting the refocusing focal point of the light field image to the position at which the recognized person is in the light field image when the facial image is associated with the first object; and perform facial recognition on the detected person in the light field image.

14. The apparatus of claim 11, wherein the code further causes the processor to be configured to:

perform facial recognition on the detected person in the light field image; and set the refocusing focal point of the light field image to a second position at which the recognized person has a social relationship with the first object and is in the light field image.

15. The apparatus of claim 13, wherein the code further causes the processor to be configured to:

perform facial recognition on the detected person in the light field image; and set the refocusing focal point of the light field image to the position at which the recognized person that has a social relationship with the first object is in the light field image when a comparison of the first object with the recognized person indicates that the recognized person is an object that has the social relationship with the first object.

16. The apparatus of claim 11, wherein the code further causes the processor to be configured to:

score a detected face in the facial image according to a preset rule; and determine that the refocusing focal point of the light field image is at the position at which a person corresponding to the detected face having a highest score is in the light field image.

17. The apparatus of claim 11, wherein the code further causes the processor to be configured to present the light field image whose refocusing focal point is selected.

18. The apparatus of claim 16, wherein the code further causes the processor to be configured to receive a confirmation instruction that the refocusing focal point is selected.

19. The apparatus of claim 13, wherein the code further causes the processor to be configured to set the refocusing focal point of the light field image to the position at which the first object is in the light field image when a comparison of the second facial image with the facial image indicates images of a same person.

* * * * *